Nov. 10, 1942.       B. G. CARLSON ET AL       2,301,200
GYROMAGNETIC COMPASS
Original Filed Dec. 2, 1938      2 Sheets-Sheet 1

INVENTORS
BERT G. CARLSON
BRUNO A. WITTKUHNS,
BY
their ATTORNEY

Nov. 10, 1942.    B. G. CARLSON ET AL    2,301,200
GYROMAGNETIC COMPASS
Original Filed Dec. 2, 1938    2 Sheets-Sheet 2

INVENTORS
BERT G. CARLSON
BRUNO A. WITTKUHNS,
BY
Herbert H. Thompson
ATTORNEY

Patented Nov. 10, 1942

2,301,200

UNITED STATES PATENT OFFICE 2,301,200

GYROMAGNETIC COMPASS

Bert G. Carlson, Cleveland, Ohio, and Bruno A. Wittkuhns, Summit, N. J., assignors to Sperry Gyroscope Company, Inc., Brooklyn, N. Y., a corporation of New York Original application December 2, 1938, Serial No. 243,488, now Patent No. 2,242,233, dated May 20, 1941. Divided and this application August 10, 1940, Serial No. 352,170

9 Claims. (Cl. 33—222)

This invention relates to directional gyroscopes and more particularly to instruments of this type as used on aircraft instead of a compass, being a divisional application of applicants' prior Patent No. 2,242,233, dated May 20, 1941, for Gyro-magnetic compasses. More particularly this invention relates to directional gyroscopes controlled by a magnetic compass element which coerces the gyro axis into a position where its axis is either parallel or normal to the horizontal component of the magnetic field. Such instruments are usually referred to in the art as gyro magnetic compasses.

One object of this invention is to provide an improved magnetic control for such directional gyroscopes in which the influence upon the magnetic element of steel bearings and pivots is balanced, or in which the magnetic element is located in such a way as never to change its relative position with respect to other magnetic parts in the instrument, so that they may be compensated for.

Another object of this invention is to provide novel means of control by which the magnetic element directly or indirectly controls air jets in such a way to exert torques on the gyroscopic element in a direction to precess the gyro wheel into the north-south plane.

A further object of the invention is to utilize the normal driving jets by which the gyro wheel is spun to exert a correcting torque directly without the use of additional air jets.

In the accompanying drawings.

Figure 1:
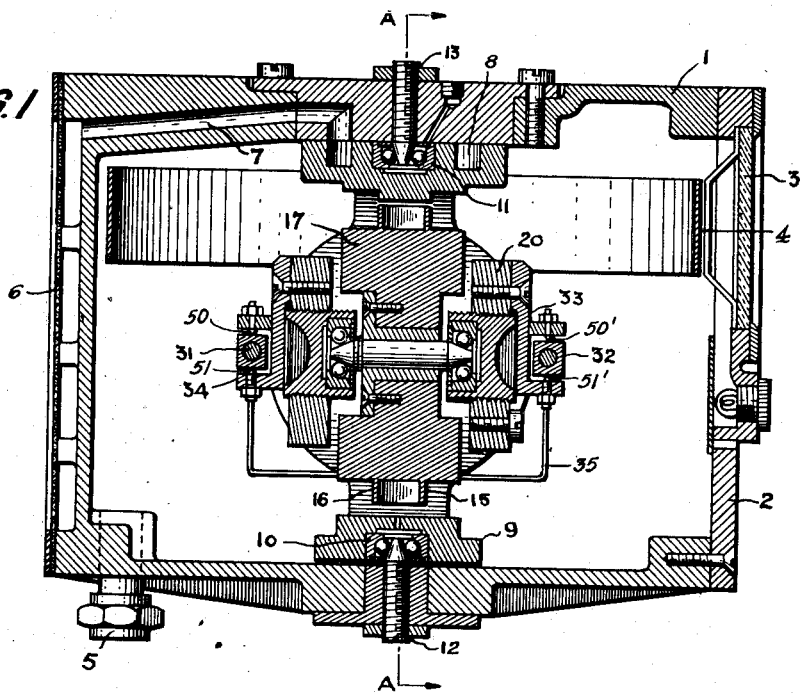
Fig. 1 shows an elevation section through our novel gyro-magnetic compass.
Figure 2:
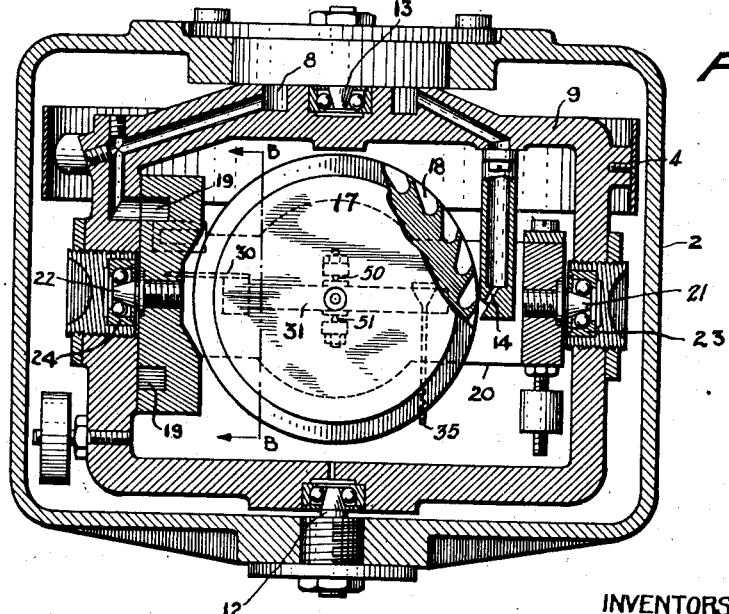
Fig. 2 shows another elevation section through the same instrument but along line A—A of Fig. 1.

The gyro magnetic compass as shown in Fig. 1 is contained within a housing 1 which is sealed by an end plate 2 containing a window 3 through which the dial 4 can be viewed. Air is exhausted from the casing through a pipe 5 and is admitted into the casing through a filter 6 from where it passes through an air duct 7 into an annular recess 8. This recess is machined into the vertical frame 9 which carries the dial 4, the lower bearing 10 and the upper bearing 11. Pivots 12 and 13 engage these bearings so that the vertical frame 9 can rotate freely around the vertical axis. A very small air gap exists between the casing 1 and the vertical frame 11 so that there is a minimum of air leakage between the passage 7 and the annular recess 8. The air from the recess 8 is conducted to one or more nozzles 14 of which only one is shown in Figs. 1 and 2. These nozzles are parallel to each other and are spaced in such a way that the air jets issuing from them impinge on the rotor 17 just within the two flanges 15 and 16. Between the flanges are located a number of pockets or blades 18 which absorb the energy of the air jets and thereby spin the rotor. The purpose of having two such air jets closely together is to provide an automatic means for erection of the gyro wheel 17 as disclosed more in detail in the U. S. patent to Carlson, No. 1,982,639, for Directional gyroscope. Whenever the gyro wheel tilts, one or the other of the flanges 15 or 16 will be subject to direct air pressure from one of the jets, causing a torque around the vertical axis to erect the gyro wheel and to hold its axis substantially normal with respect to the vertical axis of the frame 9.

Figure 4:
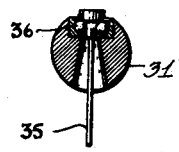
Fig. 4 is a vertical cross section through one of the magnetic members.
Figure 3:
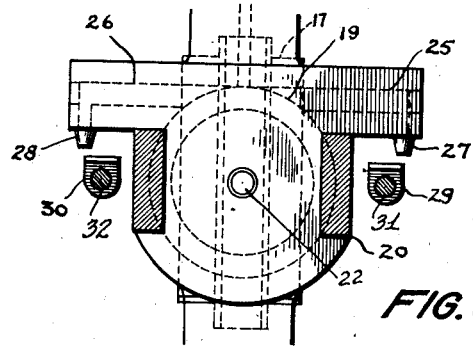
Fig. 3 is a vertical cross section and partial view of the rotor bearing frame of the compass along line B—B of Fig. 2.

From the annular recess 8 the air also is conducted to a second annular recess 19 which is located in the rotor bearing frame 20. This frame, by means of pivots 21 and 22, is mounted for oscillation around the horizontal axis in two bearings 23 and 24, carried in the vertical frame 9. A very small air gap is provided between the vertical frame 9 and the rotor bearing frame 20 adjacent to the annular recess 19 so that, while the two parts do not touch each other, a minimum loss of air is insured. As shown in Fig. 3, the air is conducted from the recess 19 through passages 25 and 26 to a pair of nozzles 27 and 28, from where the air issues in the form of jets directed downward. A pair of paddles 29 and 30 are mounted on a pair of permanent magnets 31 and 32, the magnets being pivoted in top and bottom bearings 50, 51 and 50', 51' on either side of the gyro wheel 17 as shown in Fig. 1. The bearings for the magnets are located in U-shaped brackets 33 and 34 attached to the rotor bearing frame 20, so that the magnets have a limited amount of freedom for oscillation around their vertical axes. The two magnets are interconnected by means of a light frame 35 of non-magnetic material which, as shown in Fig. 4, is journalled in both of the magnets by means of small sensitive ball bearings 36. This frame has the purpose of keeping these magnets lined up with each other so that they always swing in synchronism. As seen in Fig. 3, the paddles 29 and 30 in their normal position will each cut off about one-half of the effect of the jets 27 and 28, so that the effect of the jets is balanced. If, due to drifting of the gyroscope from the north-south plane, the relative position of the rotor bearing frame 20 and the magnets should change, one of the jets 27, 28 will be opened further while the other one will be closed more with the result that a torque around the horizontal axis will be exerted against the rotor bearing frame 20 due to the increased reaction of the fully open jet and the decreased reaction of the closed jet. This torque will precess the gyro around the vertical axis so that it will restore ultimately the balanced condition of the jets by realigning the plane of its rotation with the plane in which the magnets are held by the earth's magnetic field.

The two magnets 31 and 32 are carried on the rotor bearing frame to obtain partial stabilization in order to prevent errors resulting from the tilting of the whole case with respect to the horizontal plane. The influence of magnetic parts of the structure, as for instance, pivots and ball bearings, are equal and opposite with respect to both magnets so that no permanent errors are to be expected from this cause. Also, by providing two magnets, one on either side of the rotor, mechanical balance is maintained provided the magnets and the frame 35 are balanced with respect to their individual vertical axes.

Figure 6:
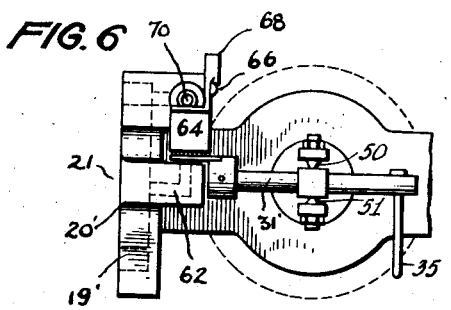
Fig. 6 is a side elevation of Fig. 5.
Figure 5:
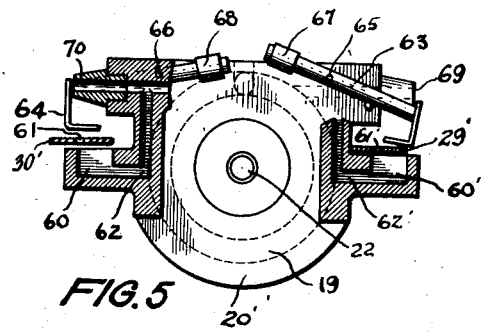
Fig. 5 is a sectional detail similar to Fig. 3 but showing a modification of the jet control.

Figs. 5 and 6 illustrate a preferred modification of our gyro magnetic compass, in which the precessing jets are indirectly controlled by the magnetic elements. We show only the rotor bearing frame 20', partly in section, and in a condition, in which the two magnets are deflected to the left. We employ in this modification an air relay in order to free the magnets from the disturbing influence of the air jets, which have a tendency to keep the magnets centered. We therefore design the paddles 30' and 29' considerably wider than before, so that they cover completely two air chambers, 60 and 60', which receive air through passages 62 and 62' from the annular recess 19. The paddles are provided with holes 61 and 61', through which air escapes permanently, forming jets. Two relay shutters 63 and 64 are mounted on the frame 20' by means of pivots 65 and 66. These shutters are fashioned of very light material and suitably counterbalanced by weights 67 and 68. If, as shown in Fig. 5, the magnets are displaced to the left, jet 61 will lift shutter 64, while the other jet 61' will move away from shutter 63, leaving same in its lowered position. Air will escape from jet 69, which is also connected to recess 19, while jet 70 is closed by shutter 64. The reaction from jet 69 will cause a torque around the horizontal axis of the gyroscope and precess its spin axis around the vertical axis, until both magnets are again in a position, where both shutters are equally under the influence of the jets issuing from the holes 61 and 61'. In this position, the shutters may be just heavy enough to keep both jets 69 and 70 open, or, if desired, light enough to keep both jets wholly or partly closed. It is evident, that by suitably dimensioning the weights 67 and 68, a very sensitive condition may be produced, in which the differential control through the magnets gives a high degree of accuracy.

Figure 7:
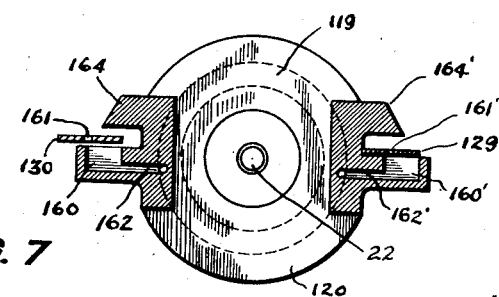
Fig. 7 is a further modification of the jet control of Fig. 5.

A further modification and simplification is shown in Fig. 7, which shows a section and view similar to Fig. 5. The rotor bearing frame 120 again is shaped to enclose an annular recess 119, but no nozzles or relay shutters are employed. The paddles 129 and 130, attached to the ends of the magnets, are mounted to swing with very little clearance over air pockets 160 and 160', supplied with air from recess 119 through passages 162 and 162'. Air issues continuously from holes 161 and 161', but normally is partly intercepted by ledges 164 and 164', projecting from the casting 120. In the position shown, the magnets are displaced to the left, so that the air jet issuing from hole 161 is free to exert its reaction against the frame 120 and the gyroscope mounted therein, while the jet issuing from hole 161' is impinging on the ledge 164', thereby canceling out its reaction, so that the net effect is an unbalanced torque in counterclockwise direction, which will precess the gyro until balance is again restored.

It is to be noted, that in the form of the invention shown in Fig. 7, the shifting of position of either or both of the paddles or jet forming cover plates 129 and 130 results in itself in a variation of the resultant torque on the gyroscope due to the opposite variations of the lever arms of the reactive force from each jet. Therefore, the ledges or baffles 164, 164' in Fig. 7 may be omitted if the reactive torque alone is found sufficient to give the gyroscope its proper rate of precession.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a gyro-magnetic compass, a gyroscopic element comprising an air driven gyroscope having a horizontal spin axis normally E—W, a horizontal tilt axis normal thereto and a vertical axis, a pair of magnets symmetrically mounted on said gyroscope for freedom about vertical axes respectively lying to the east and west of the gyroscope, means on said gyroscope forming a pair of air jets adapted to exert by reaction normally balanced opposed torques upon said gyroscope about its horizontal tilt axis for causing, when unbalanced, precession around its vertical axis, means mounted on said magnets for differentially varying the torques caused by said pair of jets upon azimuthal deviation from normal relation between said gyroscope and magnets, and means interconnecting said magnets for maintaining synchronism of their movements.

2. In a gyro-magnetic compass, a gyroscope mounted for freedom about a vertical and a horizontal axis and for spinning about a second horizontal axis, magnetic means supported on said gyroscope for freedom about a vertical axis, a pair of air jet forming means mounted on said magnetic means and normally maintained in a symmetrical position on opposite sides of said first named hoizontal axis, and means differentially responsive to displacement of at least one of said jet forming means from said symmetric position for causing precession of said gyroscope around said vertical axis in accordance with the direction and magnitude of said displacement.

3. In a gyro-magnetic compass, a gyroscopic element comprising a gyroscope with horizontal spin axis normally positioned E—W and mounted for three degrees of freedom, a magnetic compass element comprising a pair of permanent magnets separately pivotally mounted on said gyroscope adjacent opposite ends of said axis respectively for freedom around spaced vertical axes, a link for maintaining said magnets parallel to each other, a pair of opposed air jets normally causing balanced torques on said gyroscope, and baffle means on each magnet for differentially intercepting said respective jets to vary said torques controlled by angular displacement of said gyroscope and magnets in azimuth, whereby said gyroscopic element is precessed to maintain said spin axis in an E—W direction.

4. In a gyro-magnetic compass, a gyroscope mounted for freedom about a vertical and a horizontal axis and for spinning about a second horizontal axis, a pair of spaced magnetic means supported on said gyroscope on each side of said first horizontal axis for freedom about vertical axes and lying substantially in the horizontal plane through said horizontal axis, a plurality of air jets adapted to exert normally balanced opposing torques upon said gyroscope about said horizontal axis and causing precession around said vertical axis when unbalanced, and means carried on each of said magnetic means for differentially intercepting a respective one of said jets upon relative displacement of said gyroscope and said magnetic means to unbalance their reactive torque, whereby the resulting precession rebalances said torques as said displacement is eliminated.

5. In an air flow pick-off device, a follow-up element, a sensitive element pivotally mounted thereon, a pair of spaced broad ports in the follow-up element through which air is caused to flow, and a pair of movable non-contacting covers for said ports on said sensitive element and each having a jet forming aperture therethrough and an intercepting baffle for each jet on said follow-up element, whereby upon relative turning of said elements said apertures are shifted to differentially vary the proportion of each jet intercepted by the baffle to vary the resultant reactions of said jets to cause said follow-up element to follow said sensitive element.

6. In an air flow pick-off device for the magnetic element of a gyro-magnetic compass, the combination with a gyroscope mounted for oscillation about a horizontal axis and orientation in azimuth and a magnetic element also mounted for orientation in azimuth, of a pair of spaced broad ports on said gyroscope, means for causing flow of air therethrough, and a pair of movable non-contacting covers each covering a respective one of said ports positioned by said magnetic element and each having a jet forming aperture therethrough normally symmetrically spaced from said horizontal axis, whereby upon relative turning of said gyroscope and magnet, said apertures are shifted toward and away from said horizontal axis to differentially vary the lever arm of the net reaction torque of said jets.

7. In an air flow pick-off device for the follow-up element of a sensitive element, the combination with the said follow-up element with said sensitive element mounted thereon, of a pair of broad ports in the follow-up element through which a flow of air is caused, non-contacting covers for said ports movably mounted on said sensitive element having jet forming small apertures therethrough normally exerting equal and opposite torques on the follow-up element, whereby upon relative turning of said elements, said apertures are shifted, thereby exerting an unbalanced torque on said follow-up element and causing said follow-up element to follow the sensitive element.

8. In a gyro-magnetic compass, a gyroscope mounted for freedom about a vertical and a horizontal axis and for spinning about a second horizontal axis, a direction seeking magnet pivotally supported on said gyroscope for freedom about a vertical axis, a wide mouthed port on said gyroscope to one side of said first mentioned horizontal axis for discharging air, a baffle on said magnet having a small aperture and substantially closing said port except for the jet from said aperture, whereby the position of said jet is varied upon relative turning of said magnet and gyroscope, and another jet means on said gyroscope for normally balancing the reaction from said first named jet when said gyroscope and magnet are in a normal predetermined relation, whereby, upon relative turning of said magnet and gyroscope, an unbalanced torque is caused on the gyroscope about said horizontal axis in one direction or the other to cause the gyro to precess to restore said predetermined relation.

9. In an air flow torque applying device for the gyroscopic element of a gyro-magnetic compass, the combination with the said gyroscope, mounted for turning about a vertical axis and freedom about a horizontal axis, a magnetic element pivoted thereon, a port on said gyro element to one side of said horizontal axis, means for causing flow of air therethrough, a movable, non-contacting cover for said port turned from said magnetic element having a jet forming aperture therethrough movable toward and away from said axis, and a second jet forming aperture on said element, normally balancing the reaction from said other jet, whereby, upon relative turning of said elements, the relative position of said apertures is shifted relatively to said gyroscopic element to differentially vary the direction and lever arm of the net reaction torques of said jets.

BERT G. CARLSON.
BRUNO A. WITTKUHNS.